US010073432B2

(12) United States Patent
Koga

(10) Patent No.: US 10,073,432 B2
(45) Date of Patent: Sep. 11, 2018

(54) NUMERICAL CONTROLLER HAVING TOOL TIP POINT CONTROL FUNCTION

(71) Applicant: FANUC Corporation, Minamitsuru-gun, Yamanashi (JP)

(72) Inventor: Daijirou Koga, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 295 days.

(21) Appl. No.: 14/750,208

(22) Filed: Jun. 25, 2015

(65) Prior Publication Data
US 2015/0378343 A1 Dec. 31, 2015

(30) Foreign Application Priority Data

Jun. 26, 2014 (JP) .................................. 2014-131725

(51) Int. Cl.
G05B 19/404 (2006.01)
G05B 19/19 (2006.01)
G05B 19/4103 (2006.01)

(52) U.S. Cl.
CPC ......... *G05B 19/19* (2013.01); *G05B 19/4103* (2013.01); *G05B 2219/34153* (2013.01); *G05B 2219/37077* (2013.01)

(58) Field of Classification Search
CPC ................ G05B 19/19; G05B 19/4103; G05B 2219/34153; G05B 2219/37077
See application file for complete search history.

(56) References Cited

U.S. PATENT DOCUMENTS

| 6,242,880 B1* | 6/2001 | Hong | G05B 19/416 318/571 |
| 2002/0002420 A1 | 1/2002 | Hirai et al. | |
| 2008/0161964 A1* | 7/2008 | Irie | B23K 26/0884 700/166 |

(Continued)

FOREIGN PATENT DOCUMENTS

| EP | 1235126 A1 | 8/2002 |
| JP | H05-100723 A | 4/1993 |

(Continued)

OTHER PUBLICATIONS

Decision to Grant a Patent dated Nov. 29, 2016 in Japanese Patent Application No. 2015-248222 (3 pages) with an English Translation (3 pages).

(Continued)

*Primary Examiner* — Miranda M Huang
*Assistant Examiner* — Brian T McMenemy
(74) *Attorney, Agent, or Firm* — Drinker Biddle & Reath LLP

(57) ABSTRACT

In a numerical controller having a tool tip point control function, a provisional tool tip point movement path calculation unit calculates a fourth movement path of a tip point of a tool on the basis of a third movement path obtained by linearly interpolating a second movement path for moving a control point of the tool along the second movement path, and a post-linear interpolation movement instruction output unit outputs a third movement instruction if it is determined that the difference between a first movement path for moving the tip point of the tool along the first movement path and the fourth movement path is within a predetermined tolerance.

3 Claims, 12 Drawing Sheets

(56) References Cited

U.S. PATENT DOCUMENTS

| | | | |
|---|---|---|---|
| 2009/0112356 A1 | 4/2009 | Abe | |
| 2009/0228138 A1 | 9/2009 | Otsuki et al. | |
| 2010/0121487 A1* | 5/2010 | Kawaguchi | H01L 21/67265 |
| | | | 700/228 |
| 2012/0068658 A1* | 3/2012 | Jalluri | G05B 23/0235 |
| | | | 318/561 |
| 2012/0239182 A1* | 9/2012 | Kikata | G05B 19/4061 |
| | | | 700/186 |
| 2012/0239192 A1* | 9/2012 | Yamato | B25J 9/1682 |
| | | | 700/250 |
| 2014/0148942 A1* | 5/2014 | Thomasset-Laperriere | |
| | | | G05B 19/4166 |
| | | | 700/188 |
| 2014/0350709 A1 | 11/2014 | Mochida | |

FOREIGN PATENT DOCUMENTS

| | | |
|---|---|---|
| JP | 2001-092516 A | 4/2001 |
| JP | 2003-195917 A | 7/2003 |
| JP | 2009-054186 A | 3/2009 |
| JP | 2009-110083 A | 5/2009 |
| JP | 2009-217326 A | 9/2009 |
| JP | 2011-070483 A | 4/2011 |
| JP | 2013-117924 A | 6/2013 |
| JP | 2014-229134 A | 12/2014 |

OTHER PUBLICATIONS

Notification of Reasons for Refusal dated Oct. 27, 2015 in Japanese Patent Application No. 2014-131725 (2 pages) with an English Translation (3 pages).

* cited by examiner

G01 X0 Y0 C45.0 F1000
X−38.0 Y−32.0 C60.0
X−84.0 Y−52.0 C75.0

CONTROL POINT PATH ENLARGED IN Y-DIRECTION ONLY

REVERSAL OCCURS IN THE MIDDLE
OF BLOCK AND AT JOINT PORTION
BETWEEN BLOCKS

NUMERICAL CONTROLLER HAVING TOOL TIP POINT CONTROL FUNCTION

BACKGROUND OF THE INVENTION

Field of the Invention

The present invention relates to a numerical controller, and particularly relates to a numerical controller capable of suppressing a backlash that occurs during tool tip point control.

Description of the Related Art

Tool tip point control is control that drives a control point of a tool so that a tip point of the tool moves on an instructed movement path at a +n instructed speed even under an instruction that causes the posture of the tool to change from moment to moment in five-axis machining in which movement of linear axes and movement of rotational axes are simultaneously instructed.

Regarding such tool tip point control, Japanese Patent Laid-Open No. 2003-195917 discloses a numerical controller for controlling a five-axis machine tool, the numerical controller being capable of linearly driving a table along an X-axis and a Y-axis while rotating the table about a C-axis, which is a rotation axis about a Z-axis perpendicular to the X-axis and the Y-axis, and linearly driving a tool along the Z-axis while rotating the tool about an A-axis, which is a rotation axis about the X-axis.

In the tool tip point control of the numerical controller disclosed in Japanese Patent Laid-Open No. 2003-195917, an instruction for moving a tool tip point is converted to an instruction for moving a tool control point once, and, in the middle of the path, the tool control point is driven so that the tool tip point moves on an instructed movement path. For example, as shown in FIG. 12, when an instruction for moving the tool tip point is given in tool tip point control mode, the posture of a tool changes moment to moment but the tool tip point is controlled so as to move on an instructed straight line. In this case, the path of the control point is responsive to the change of the posture of the tool and thus forms a curved line as shown in FIG. 12.

As described above, during tool tip point control, a path of a control point generally forms a curved line. This causes a problem in that the path of the control point easily reverts (makes a backlash) in the middle of a block during tool tip point control. For example, under the instruction illustrated in FIG. 13A, the control point path appears to form a straight line. Actually, however, the control point path slightly reverts in a Y-axis direction in each instruction block. Specifically, as shown, the control point path reverts in the Y-axis direction at a point A, which is in the middle of a block, and also at a point B, which is a joint portion between blocks.

Accordingly, during tool tip point control, the path easily reverts, invoking a compensation function such as backlash correction and backlash acceleration. Such compensation function, however, tends to be overly effective, causing a problem of adversely affecting a machined surface quality.

SUMMARY OF THE INVENTION

It is thus an object of the present invention to provide a numerical controller capable of suppressing a backlash that occurs during tool tip point control.

A numerical controller having a tool tip point control function according to one aspect of the present invention generates, in a multi-axis machine tool having three linear axes and two rotation axes, a first movement instruction for moving a tip point of a tool along a first movement path and generates, on the basis of the first movement instruction, a second movement instruction for moving a control point of the tool along a second movement path. The numerical controller having the tool tip point control function includes a control point interpolation unit for outputting a third movement instruction for moving the control point of the tool along a third movement path obtained by linearly interpolating the second movement path. The control point interpolation unit includes a provisional tool tip point movement path calculation unit for calculating, on the basis of the third movement path, a fourth movement path of the tip point of the tool, a determination unit for determining whether the distance between the first movement path and the fourth movement path is within a predetermined tolerance, and a post-linear interpolation movement instruction output unit for outputting the third movement instruction if the determination unit determines that the distance is within the predetermined tolerance.

A numerical controller having a tool tip point control function according to another aspect of the present invention generates, in a multi-axis machine tool having three linear axes and two rotation axes, a first movement instruction for moving a tip point of a tool along a first movement path and generates, on the basis of the first movement instruction, a second movement instruction for moving a control point of the tool along a second movement path. The numerical controller having the tool tip point control function includes a control point interpolation unit for outputting a third movement instruction for moving the control point of the tool along a third movement path obtained by linearly interpolating the second movement path. The control point interpolation unit includes a determination unit for determining whether the distance between the second movement path and the third movement path is within a predetermined tolerance, and a post-linear interpolation movement instruction output unit for outputting the third movement instruction if the determination unit determines that the distance is within the predetermined tolerance.

A numerical controller having a tool tip point control function according to yet another aspect of the present invention generates, in a multi-axis machine tool having three linear axes and two rotation axes, a first movement instruction for moving a tip point of a tool along a first movement path and generates, on the basis of the first movement instruction, a second movement instruction for moving a control point of the tool along a second movement path. The numerical controller having the tool tip point control function includes a control point interpolation unit for outputting a third movement instruction for moving the control point of the tool along a third movement path obtained by linearly interpolating the second movement path. The control point interpolation unit includes a second movement instruction interpolation count determination unit for determining whether the movement of the control point of the tool on the basis of the second movement instruction is completed within a predetermined number of interpolation cycles, a post-linear interpolation movement instruction output unit for outputting the third movement instruction if the second movement instruction interpolation count determination unit determines that the movement of the control point of the tool on the basis of the second movement instruction is completed within the predetermined number of interpolation cycles, a first movement instruction interpolation count determination unit for determining whether the movement of the tip point of the tool on the basis of the first movement instruction is completed within a predetermined number of interpolation cycles, and a post-linear interpolation movement instruction output unit for outputting the third movement instruction if the first movement instruction interpolation count determination unit determines that the movement of the tip point of the tool on the basis of the first movement instruction is completed within the predetermined number of interpolation cycles.

Because the numerical controller in accordance with the present invention is configured as described above, the path of a tool tip point generally deviates from an instructed path. The deviation of the tool tip point due to the linear interpolation of a control point path, however, is within an allowable range, and a reversal of the control point becomes harder to occur in comparison with a conventional tool tip point control. As a result, an invocation of a compensation function for backlash can be minimized, which improves a machined surface quality.

The above-described and other objects of the present invention will become apparent by reading the following description of embodiments with reference to the accompanying drawings.

DETAILED DESCRIPTION OF THE PREFERRED EMBODIMENTS

Figure 1:
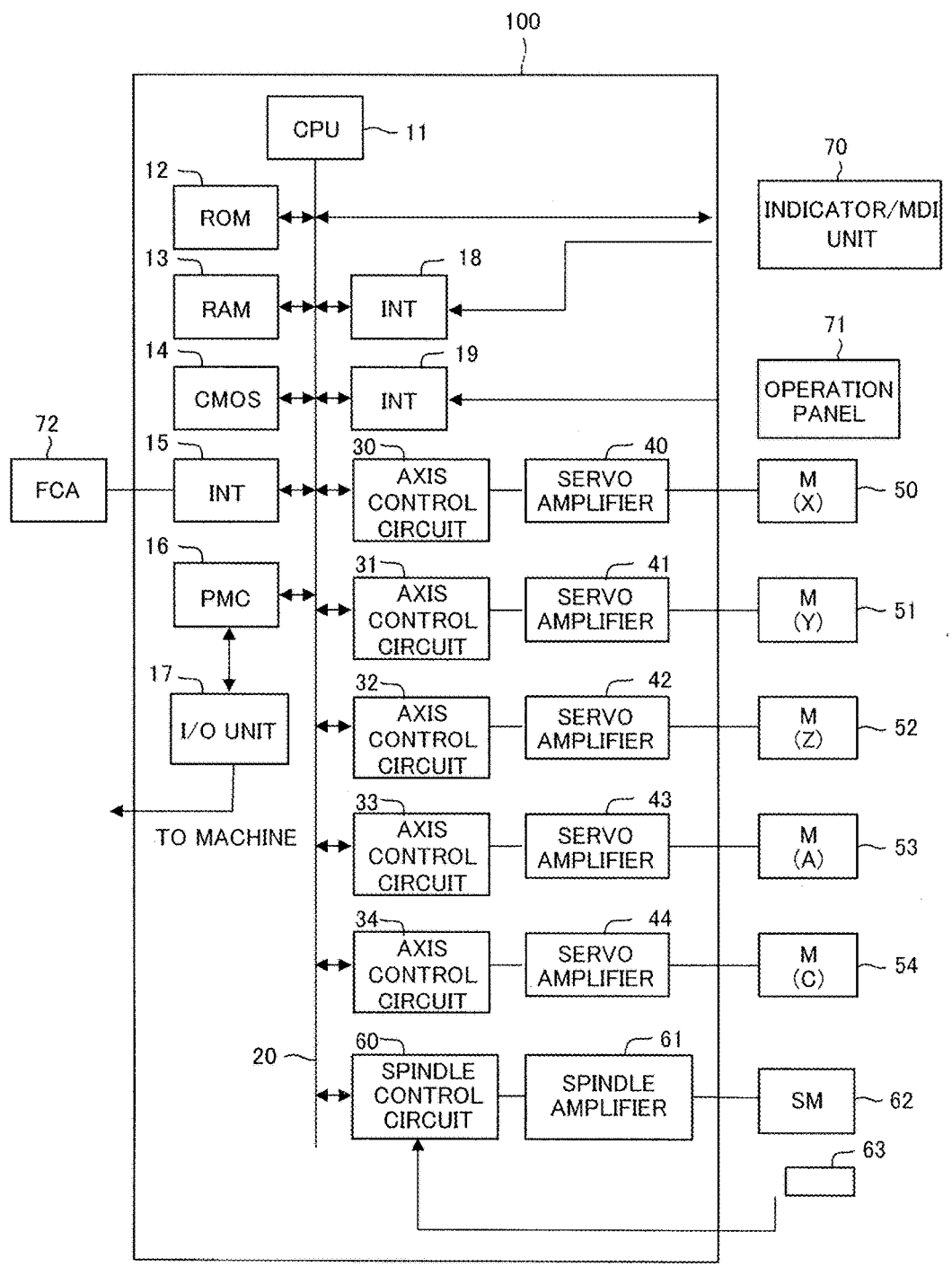
FIG. 1 is a block diagram illustrating main parts of a numerical controller in some embodiments of the present invention.

FIG. 1 is a block diagram illustrating main parts of a numerical controller (CNC) 100 that embodies tool tip point control in some embodiments of the present invention. A CPU 11 is a processor that totally controls the numerical controller 100. The CPU 11 reads, via a bus 20, a system program stored in a ROM 12. The CPU 11 then controls the whole numerical controller in accordance with the system program. A RAM 13 stores temporal calculation data, display data, and various types of data entered by an operator via an indicator/MDI unit 70.

A CMOS 14 is backed up with a battery, which is not shown, and is configured as a non-volatile memory that maintains a state of memory even when the numerical controller 100 is powered off. The CMOS memory 14 stores a machining program, such as the one described below, that is read via an interface 15 and a machining program that is entered via the indicator/MDI unit 70, for example. Various system programs for executing a processing in an edit mode needed for creating and editing a machining program and a processing for automatic operation are preliminarily written in the ROM 12. Various machining programs such as a machining program for embodying the present invention can be entered via the interface 15 or the indicator/MDI unit 70 and stored in the CMOS memory 14.

The interface 15 is an interface for connecting an external device 72, such as an adapter, to the numerical controller 100. A machining program and various parameters, for example, are read from the external device 72. Also, a machining program edited in the numerical controller 100 can be stored in an external storage unit via the external device 72. A programmable machine controller (PMC) 16 controls an auxiliary device (e.g., an actuator such as a robot hand for replacing a tool) of a machine tool by outputting a signal to the auxiliary device via an I/O unit 17 in accordance with a sequence program embedded in the numerical controller 100. Also, the PMC 16 receives a signal from various switches of an operation panel provided on the body of the machine tool, for example, processes the signal as needed, and passes the signal to the CPU 11.

The indicator/MDI unit 70 is a manual data entry device having a display, a keyboard, and the like. An interface 18 receives an instruction and data entered from the keyboard of the indicator/MDI unit 70 and passes them to the CPU 11. An interface 19 is connected to an operation panel 71 having a manual pulse generator and the like.

Axis control circuits 30 to 34 of respective axes receive an amount of movement of each axis instructed from the CPU 11 and output an instruction for each axis to servo amplifiers 40 to 44. On receiving the instruction, the servo amplifiers 40 to 44 drive servo motors 50 to 54 of respective axes. The servo motors 50 to 54 of respective axes include a position/speed detector and perform a feedback control by feeding a position/speed feedback signal from the position/speed detector back to the axis control circuits 30 to 34. The feedback of position/speed is omitted in the block diagram.

A spindle control circuit 60 receives a spindle rotation instruction for the machine tool and outputs a spindle speed signal to a spindle amplifier 61. On receiving the spindle speed signal, the spindle amplifier 61 rotates a spindle motor 62 of the machine tool at an instructed rotating speed to drive a tool.

A position coder 63 is connected to the spindle motor 62 via gear wheels or a belt, for example. The position coder 63 is synchronized with the rotation of the spindle and outputs a feedback pulse, which is then read by the processor 11.

Figure 2:
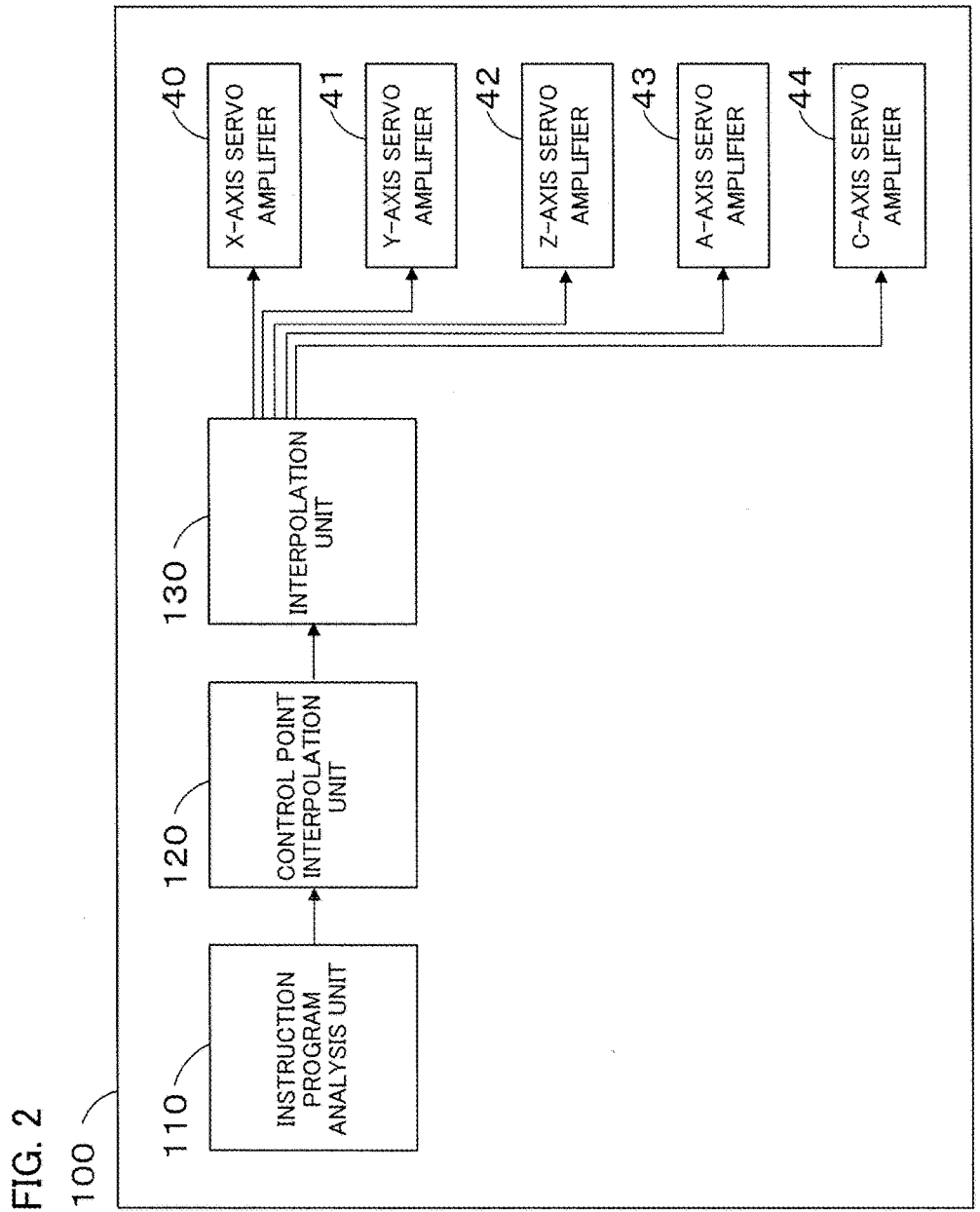
FIG. 2 is a schematic functional block diagram of a numerical controller in some embodiments of the present invention.

FIG. 2 is a schematic functional block diagram of a numerical controller in some embodiments of the present invention.

A block of an NC program, which is a machining program, is analyzed in an instruction program analysis unit 110, and a predetermined control point interpolation process is performed in a control point interpolation unit 120. With respect to a machine coordinates position on a linear axis and a rotational position on a rotation axis that are obtained by the predetermined control point interpolation process, an interpolation process is performed by an interpolation unit 130 for obtaining a position on each axis for each interpolation cycle so that the control point moves on a movement path at an instructed relative speed. On the basis of the interpolated data, a movement instruction is output to the servo amplifiers 40 to 44 of respective axes to control each axis.

A control point interpolation process performed by the control point interpolation unit 120 will now be described in detail by using embodiments 1 to 3.

Embodiment 1

The present embodiment exhibits an example of suppressing a backlash by linearly interpolating a control point path of a control point instruction converted form a tool tip point instruction in tool tip point control mode. Here, a linear interpolation unit interpolation that configures a predetermined path as a linear path.

Generally, in tool tip point control mode, a tool tip point instruction is converted to a control point instruction once, and a control is done so that a tool tip point is linearly interpolated. In the present embodiment, on the other hand, a control point path is linearly interpolated even in the tool tip point control mode if a tool tip point path calculated when the control point path is provisionally linearly interpolated in the tool tip point control mode is within an acceptable amount (hereinafter referred to as tolerance) that is set with respect to an originally instructed path.

Figure 3:
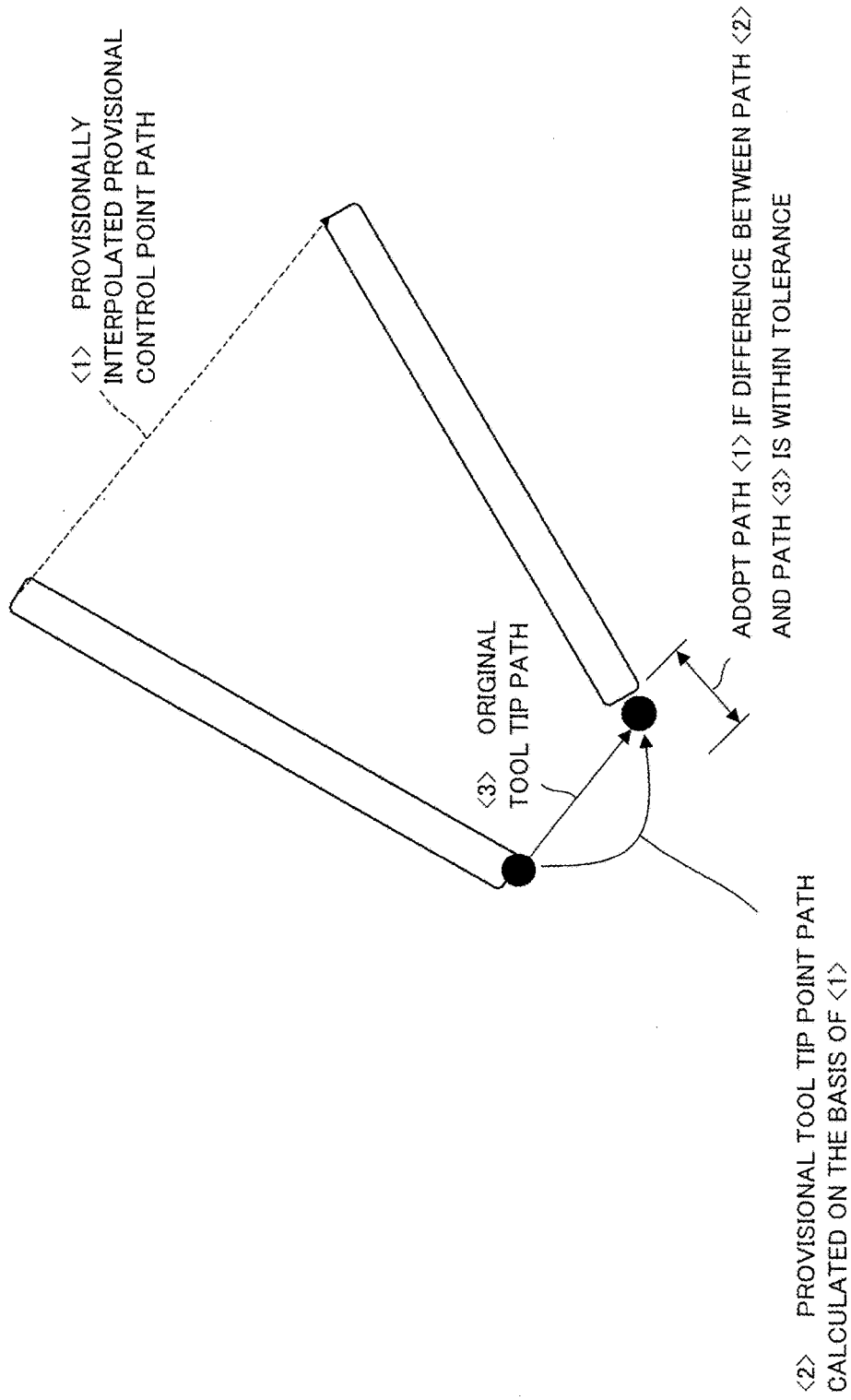
FIG. 3 is a diagram schematically illustrating a process of linearly interpolating a movement path of a control point in embodiment 1 of the present invention.

FIG. 3 is a diagram schematically illustrating the process of linearly interpolating a movement path of a control point in a technique of the present embodiment by way of the movement of a tool tip point and the control point.

In FIG. 3, <1> indicates the movement of a control point when a movement path of the control point is provisionally linearly interpolated. As shown, if the control point path is provisionally linearly interpolated, the tool tip point moves on a provisional tool tip point path indicated with <2> so as to draw an arc. In the present embodiment, it is determined whether a distance between the provisional tool tip point path calculated when the control point path is provisionally linearly interpolated and a tool tip point path <3> that is supposed to be drawn in the tool tip point control is within a tolerance.

Figure 4:
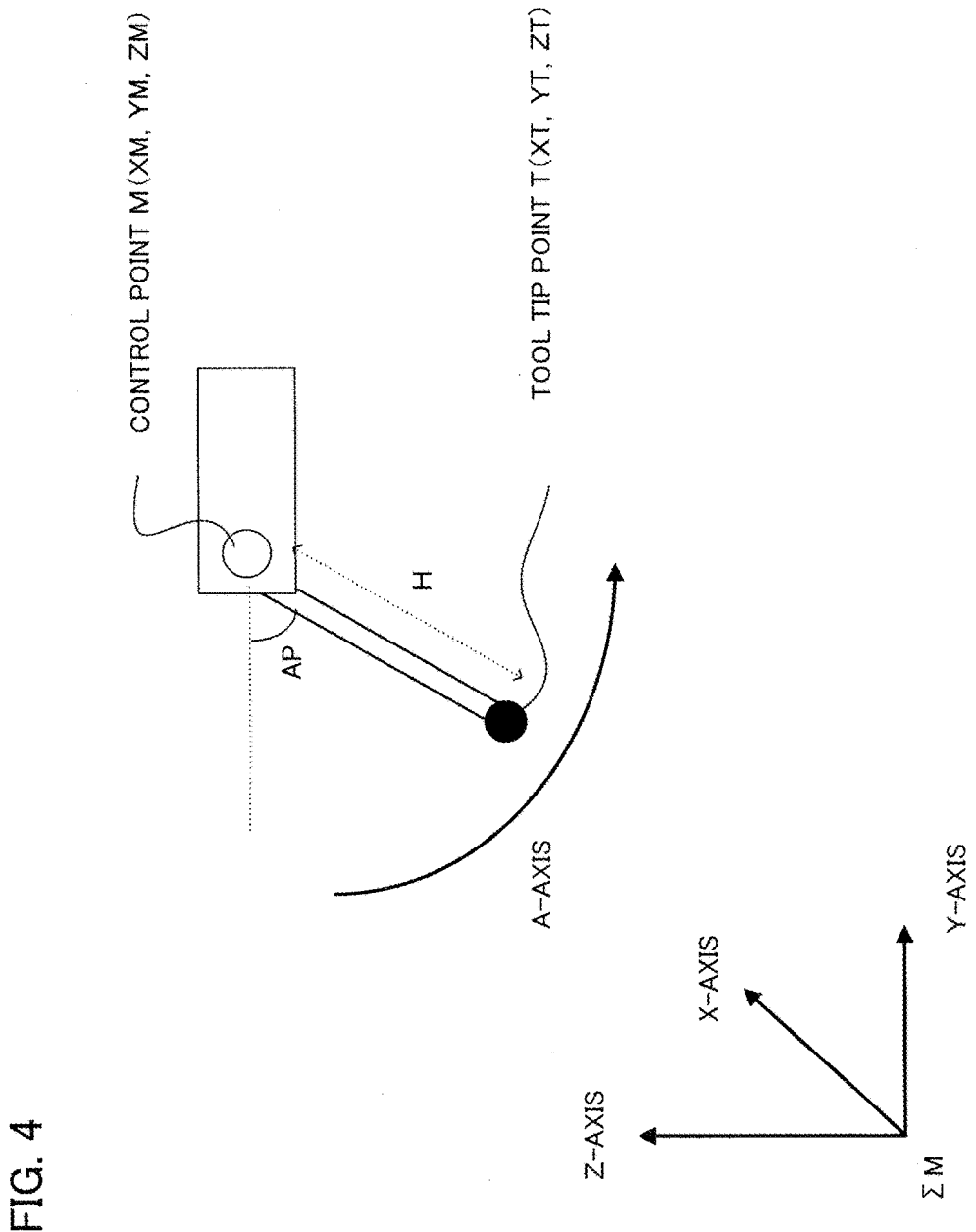
FIG. 4 is a diagram illustrating a positional relationship between a tool tip point and a control point in embodiment 1 of the present invention.

Here, suppose that, as shown in FIG. 4, the coordinates of a control point M in a machine coordinate system ΣM is $(X_M, Y_M, Z_M)$, the coordinates of a tool tip point T in the machine coordinate system ΣM is $(X_T, Y_T, Z_T)$, the inclination of a tool about an A-axis is $A_P$, and a tool length correction amount is H, for example. The tool tip point path can then be calculated from the control point path by using an expression (1).

The control point path can also be inversely calculated from the tool tip point path on the basis of the expression (1).

$$X_T = X_M$$

$$Y_T = Y_M - H\cos(A_P)$$

$$Z_T = Z_M - H\sin(A_P) \quad (1)$$

Figure 5:
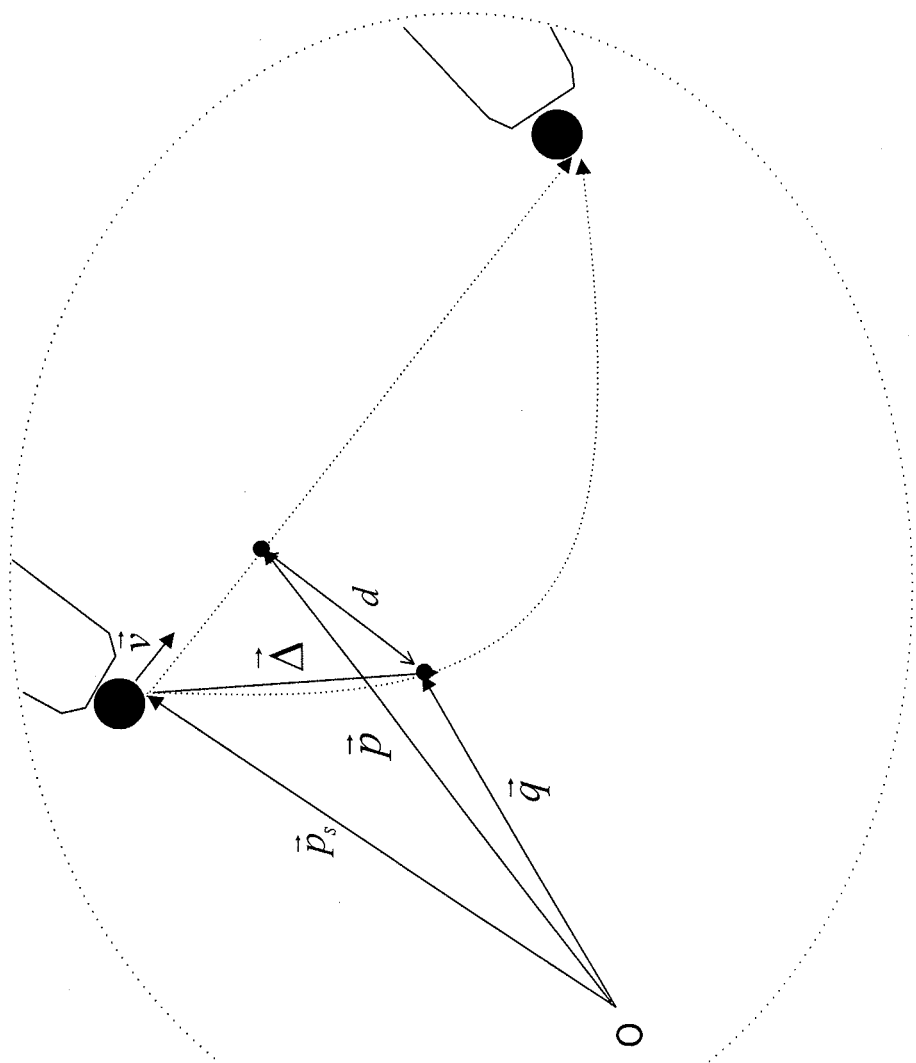
FIG. 5 is a diagram illustrating steps of calculating a distance between paths in embodiment 1 of the present invention.

FIG. 5 is an enlarged diagram illustrating the portion of the tool tip point path shown in FIG. 3. Suppose a unit vector in the direction of the tool tip point path <3> is a vector v and a start point of the tool tip point path <3> is a vector $p_s$, as shown in FIG. 5. A point on the tool tip point path <3> can then be represented as a vector p with the following expression:

$$\vec{p} = \vec{p}_s + l\vec{v} \quad (2)$$

wherein 0≤l≤block length of path <3>

Suppose a point on the provisional tool tip point path <2> is a vector q. A distance d between the point q and the tool tip point path <3> can then be calculated by the following expression:

$$\vec{\Delta} = \vec{q} - \vec{p}_s$$

$$d = |\vec{\Delta} - (\vec{\Delta} \cdot \vec{v})\vec{v}| \quad (3)$$

The control point interpolation unit 120 determines whether the distance between the provisional tool tip point path <2> and the tool tip point path <3> is within a tolerance by identifying a point $q_i$ on the provisional tool tip point path <2> at interpolation cycle intervals, calculating the distance d from the tool tip point path <3> for each point $q_i$ by the expression (3), and determining whether the distance d is equal to or less than a tolerance at all the points $q_i$.

Figure 6:
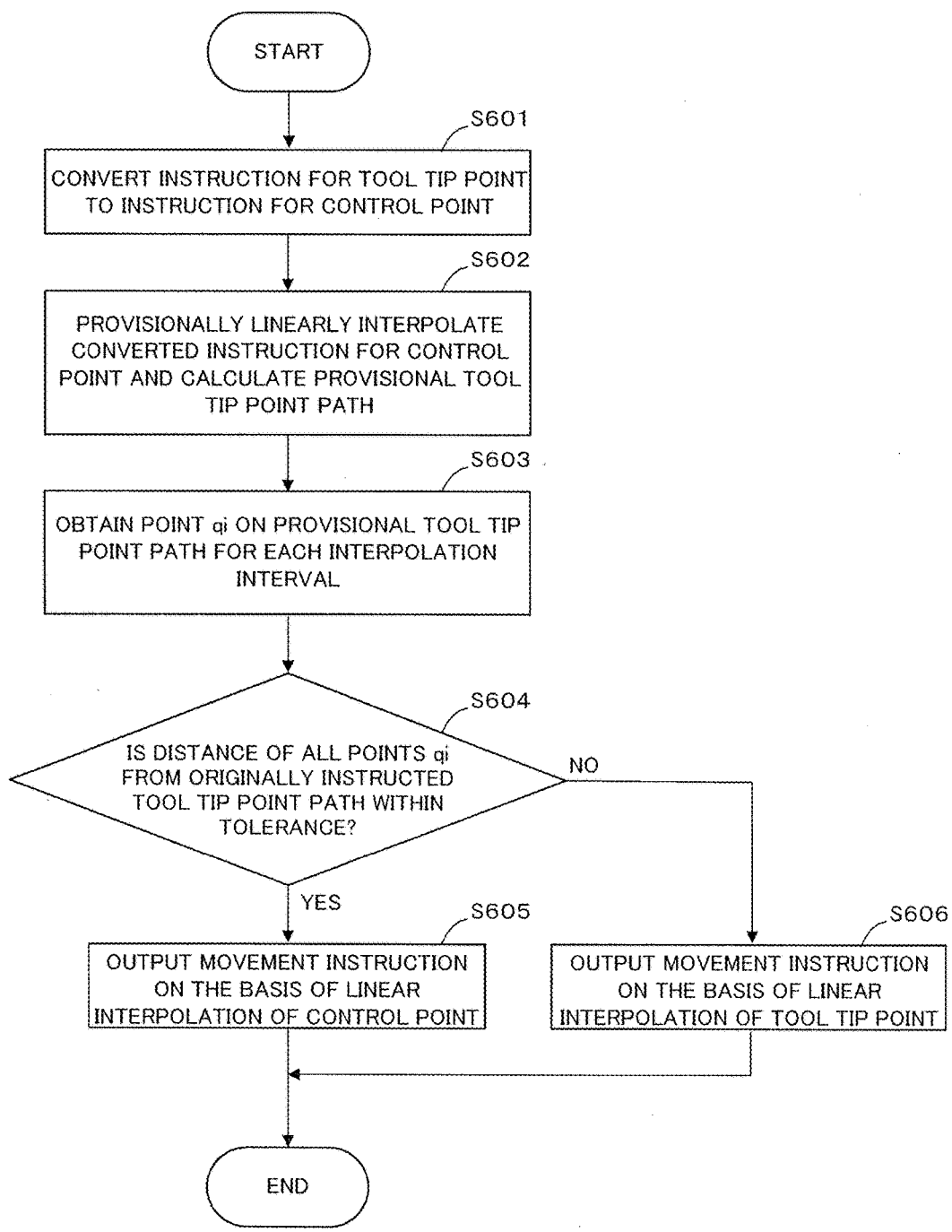
FIG. 6 is a flow chart of a control point interpolation process in embodiment 1 of the present invention.

FIG. 6 is a flow chart illustrating the algorithm of a process of linearly interpolating a movement path of a control point in a technique of the present embodiment.

When the process starts, a movement instruction for a tool tip point is initially converted to a movement instruction for a control point (S601). Next, using the control point instruction converted in S601, a provisional tool tip point path is calculated on the basis of a provisional linear interpolation of a movement path of the control point (S602). The point $q_i$ for each interpolation interval on the provisional tool tip point path calculated on the basis of the provisional linear interpolation of the movement path of the control point is then obtained (S603). For each point $q_i$, the distance $d_i$ from an originally instructed tool tip point path is calculated, and whether all of the distances $d_i$ are within a tolerance is determined (S604).

If it is determined in S604 that all of the distances $d_i$ are within a tolerance, then a movement instruction on the basis of a linear interpolation of the control point is adopted (S605). If there is any point $q_i$ whose distance $d_i$ is not within a tolerance, then a movement instruction on the basis of a linear interpolation of the tool tip point is adopted (S606).

By executing such processing, the path of the tool tip point generally deviates from an instructed path. The deviation of the tool tip point due to the linear interpolation of the control point path, however, is within a tolerance, and a reversal of the control point becomes harder to occur in comparison with a conventional tool tip point control, resulting in an improvement in a machined surface quality.

Embodiment 2

In embodiment 1, a backlash is suppressed by linearly interpolating the control point path if the provisional tool tip point path calculated when the control point path is provisionally linearly interpolated in the tool tip point control mode is within a tolerance that is set with respect to an originally instructed tool tip point path. In embodiment 2, on the other hand, a control point path is linearly interpolated even in tool tip point control mode if the control point path calculated when a tool tip point path is linearly interpolated in the tool tip point control mode is within a tolerance that is set with respect to a path obtained by provisionally linearly interpolating the control point path.

Figure 7:
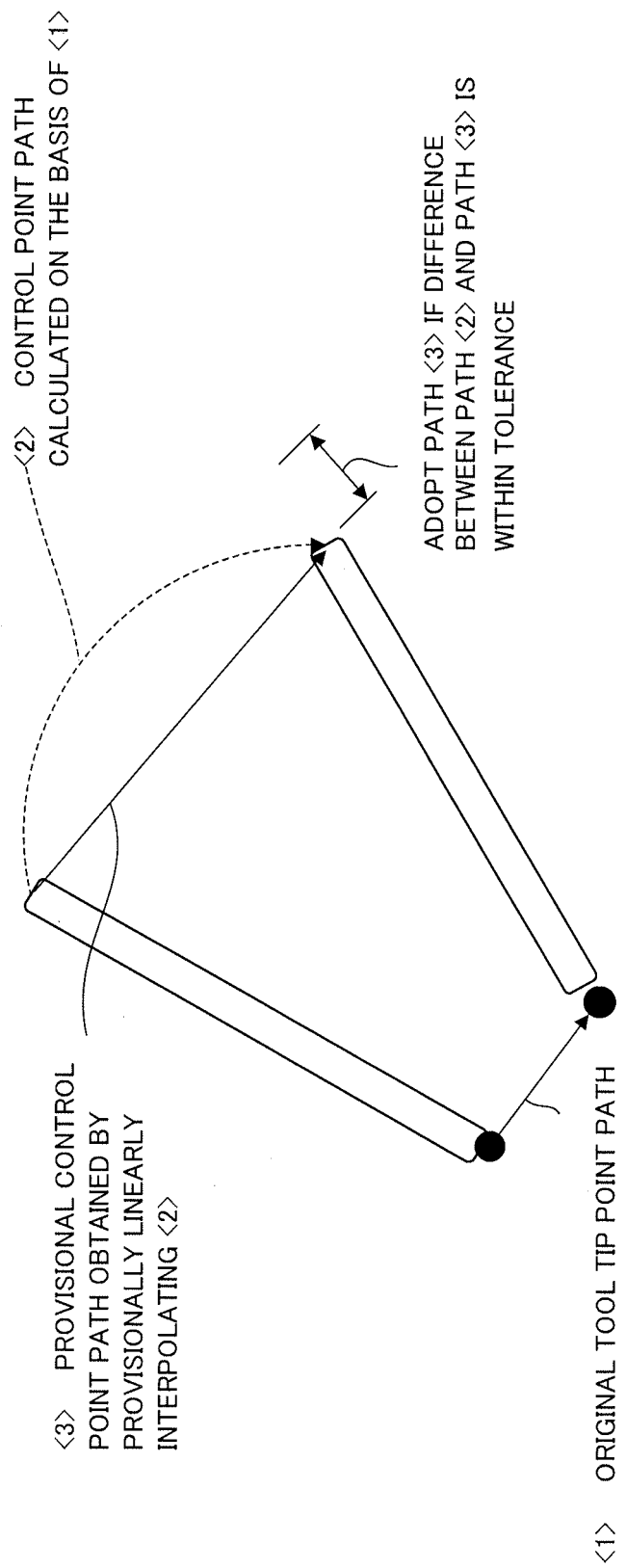
FIG. 7 is a diagram schematically illustrating a process of linearly interpolating a movement path of a control point in embodiment 2 of the present invention.

FIG. 7 is a diagram schematically illustrating the process of linearly interpolating a movement path of a control point in a technique of the present embodiment by way of the movement of a tool tip point and the control point.

In FIG. 7, <1> indicates the movement of the tool tip point that is linearly interpolated in tool tip point control. As shown, if the tool tip point path is linearly interpolated, the control point moves on a control point path indicated with <2> so as to draw an arc. In the present embodiment, it is determined whether a distance between the control point path calculated when the tool tip point path is linearly interpolated and a provisional control point path <3> obtained by provisionally linearly interpolating the control point path is within a tolerance.

A technique of calculating the tool tip point path from the control point path and a technique of calculating the control point path from the tool tip point path are the same as those of embodiment 1, and the description of these techniques is thus omitted.

Figure 8:
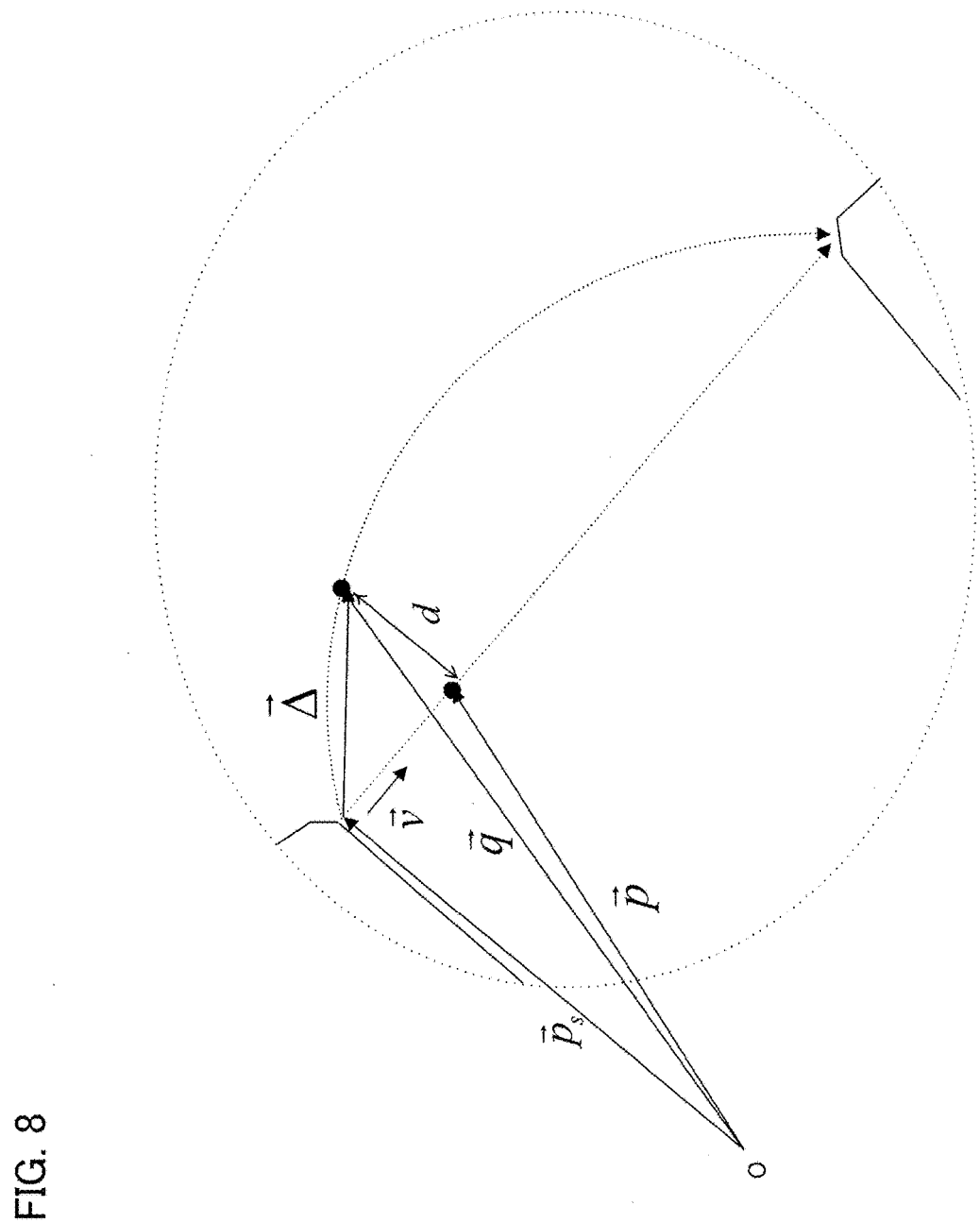
FIG. 8 is a diagram illustrating steps of calculating a distance between paths in embodiment 2 of the present invention.

FIG. 8 is an enlarged diagram illustrating the portion of the control point path shown in FIG. 7. Suppose a unit vector in the direction of the provisional control point path <3> is a vector v and a start point of the provisional control point path <3> is a vector $p_s$, as shown in FIG. 8. A point on the provisional control point path <3> can then be represented as a vector p with the following expression:

$$\vec{p} = \vec{p}_s + l\vec{v} \quad (4)$$

wherein 0≤l≤block length of path <3>

Suppose a point on the control point path <2> is a vector q. A distance d between the point q and the provisional control point path <3> can then be calculated by the following expression:

$$\vec{\Delta} = \vec{q} - \vec{p}_s$$

$$d = |\vec{\Delta} - (\vec{\Delta} \cdot \vec{v})\vec{v}| \quad (5)$$

The control point interpolation unit 120 determines whether the distance between the control point path <2> and the provisional control point path <3> is within a tolerance by identifying a point $q_i$ on the control point path <2> at interpolation cycle intervals, calculating, the distance d for each point $q_i$ by the expression (5), and determining whether the distance d from the provisional control point path <3> is equal to or less than a tolerance at all the points $q_i$.

Figure 9:
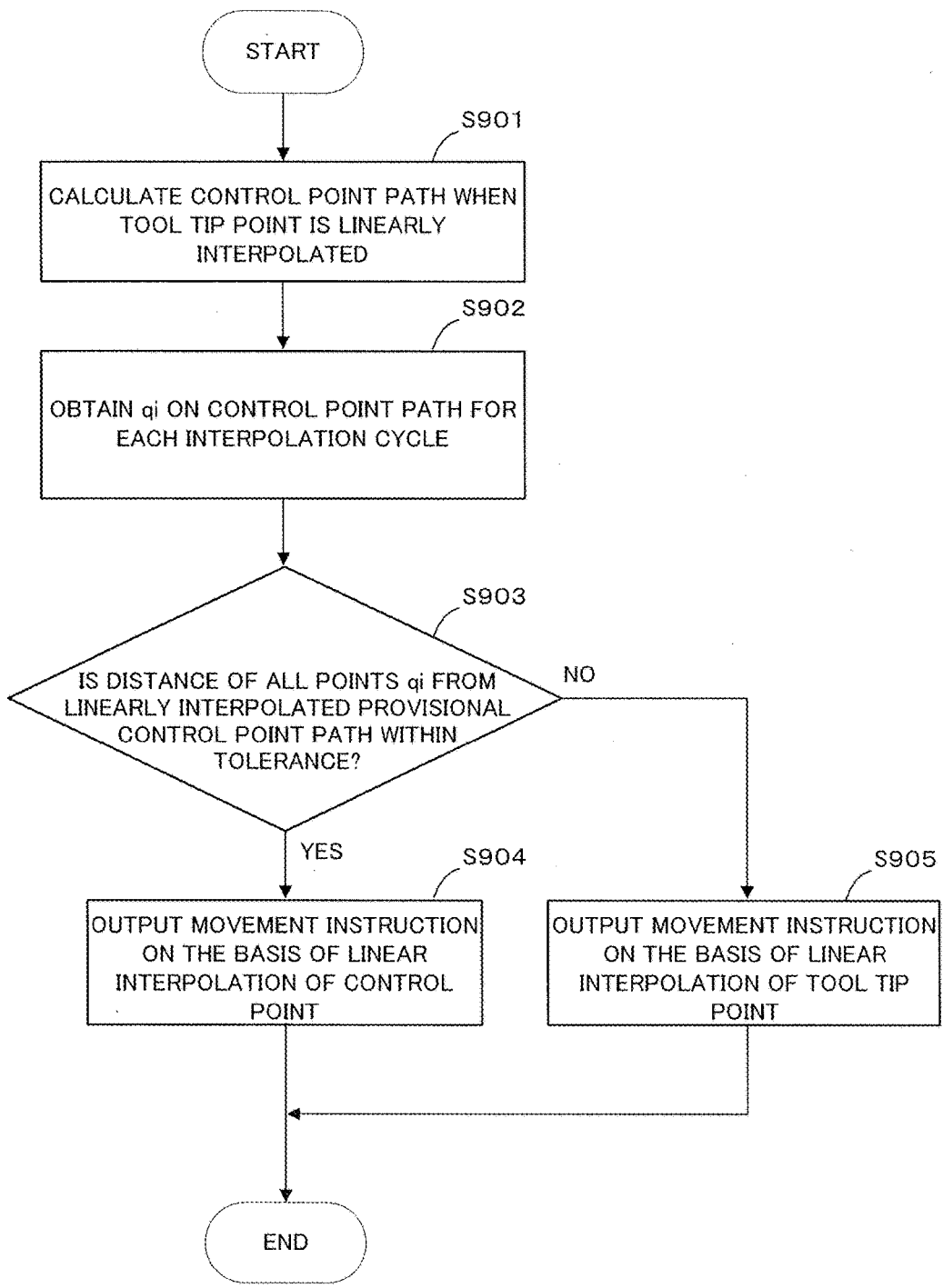
FIG. 9 is a flow chart of a control point interpolation process in embodiment 2 of the present invention.

FIG. 9 is a flow chart illustrating the algorithm of a process of linearly interpolating a movement path of a control point in a technique of the present embodiment.

When the process starts, the control point path when a tool tip point is linearly interpolated is initially calculated (S901). Next, the point $q_i$ for each interpolation cycle on the control point path calculated in S901 is obtained (S902). For each point $q_i$, the distance $d_i$ from a provisional control point path obtained by provisional linear interpolation is calculated, and whether all of the distances $d_i$ are within a tolerance is determined (S903).

If it is determined in S903 that all of the distances $d_i$ are within a tolerance, then a movement instruction on the basis of a linear interpolation of the control point is adopted (S904). If there is any point $q_i$ whose distance $d_i$ is not within a tolerance, then a movement instruction on the basis of a linear interpolation of the tool tip point is adopted (S905).

By executing such processing, a reversal of the control point becomes harder to occur in comparison with a conventional tool tip point control mode, resulting in an improvement in a machined surface quality.

Embodiment 3

Figure 13A:
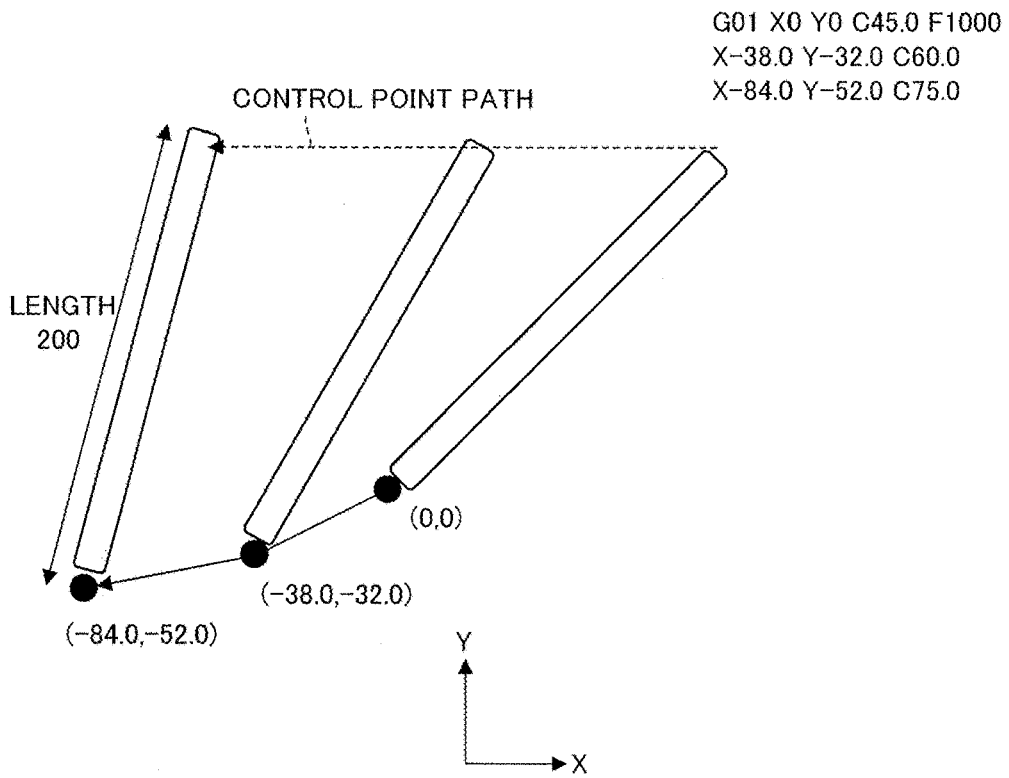
FIG. 13A is a diagram illustrating a problem with tool tip point control in a conventional art.
Figure 13B:
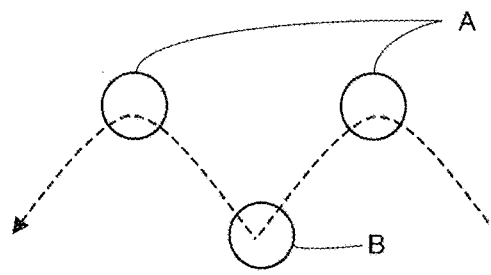
FIG. 13B is a diagram illustrating a control point path enlarged in the Y-direction only.

In embodiments 1 and 2, a backlash is suppressed by linearly interpolating the control point path when the deviation of a path due to the linear interpolation of the control point path or the tool tip point path is within a tolerance. In embodiment 3, a control is done so that the control point path is linearly interpolated when interpolation of one block of movement is completed within a specific number of interpolations in dependence upon an instructed speed. The technique of the present embodiment is based on the fact that if an instruction for one block of movement is divided into movement instructions for respective interpolation cycles on the basis of an instructed speed specified in the instruction, and the block of movement is completed in a small number of interpolation cycles, then the deviation of a tool tip point is small even if the control point path is linearly interpolated in the block of movement, and that lesser number of interpolations increases the effect of backlash because the number of interpolations executed between a reversal at the point A and a reversal at the point B illustrated in FIG. 13B decreases and the reversals thus occur more continuously.

Figure 10:
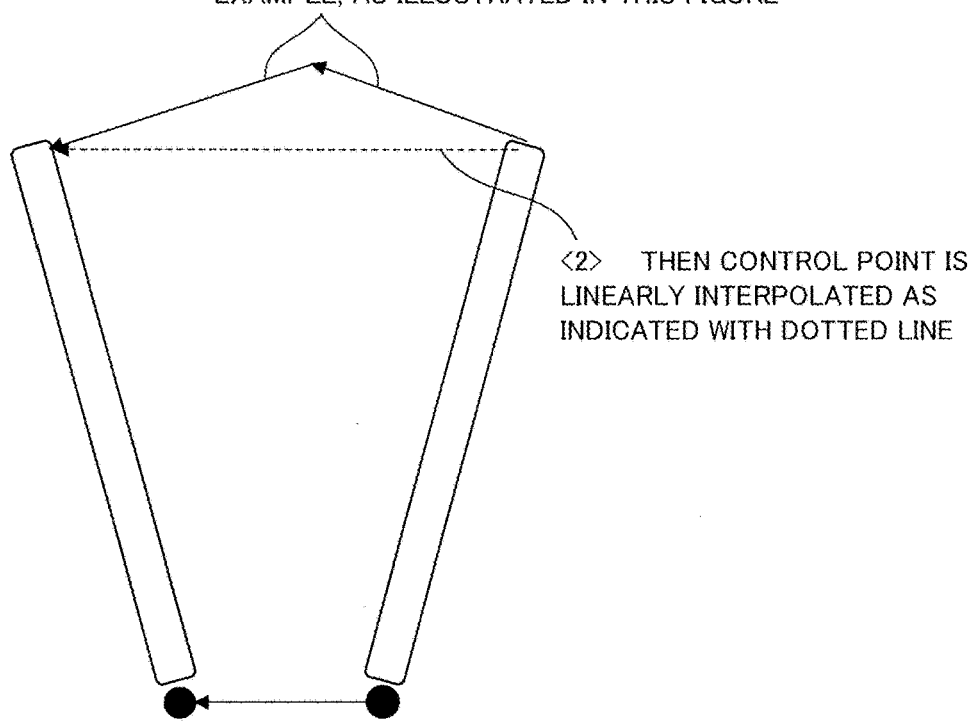
FIG. 10 is a diagram schematically illustrating a process of linearly interpolating a movement path of a control point in embodiment 3 of the present invention.
Figure 12:
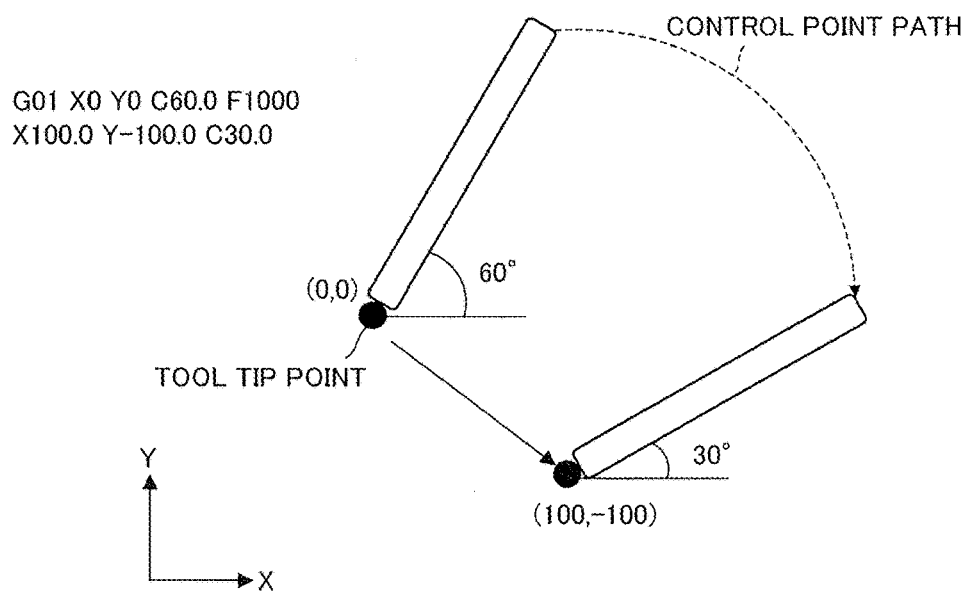
FIG. 12 is a diagram illustrating tool tip point control in a conventional art.

FIG. 10 is a diagram schematically illustrating the process of linearly interpolating a control point path in a technique of the present embodiment by way of the movement of the tool tip point and the control point.

As shown in FIG. 10, if one block of movement is divided into movement instructions respectively corresponding to interpolation cycles and a control of the movement on a control point path is completed in two interpolations as indicated with <1>, for example, then the effect on a tool tip point path due to a linear interpolation of the control point path is expected to be small. Thus, the control point is linearly interpolated as indicated with <2>.

Figure 11:
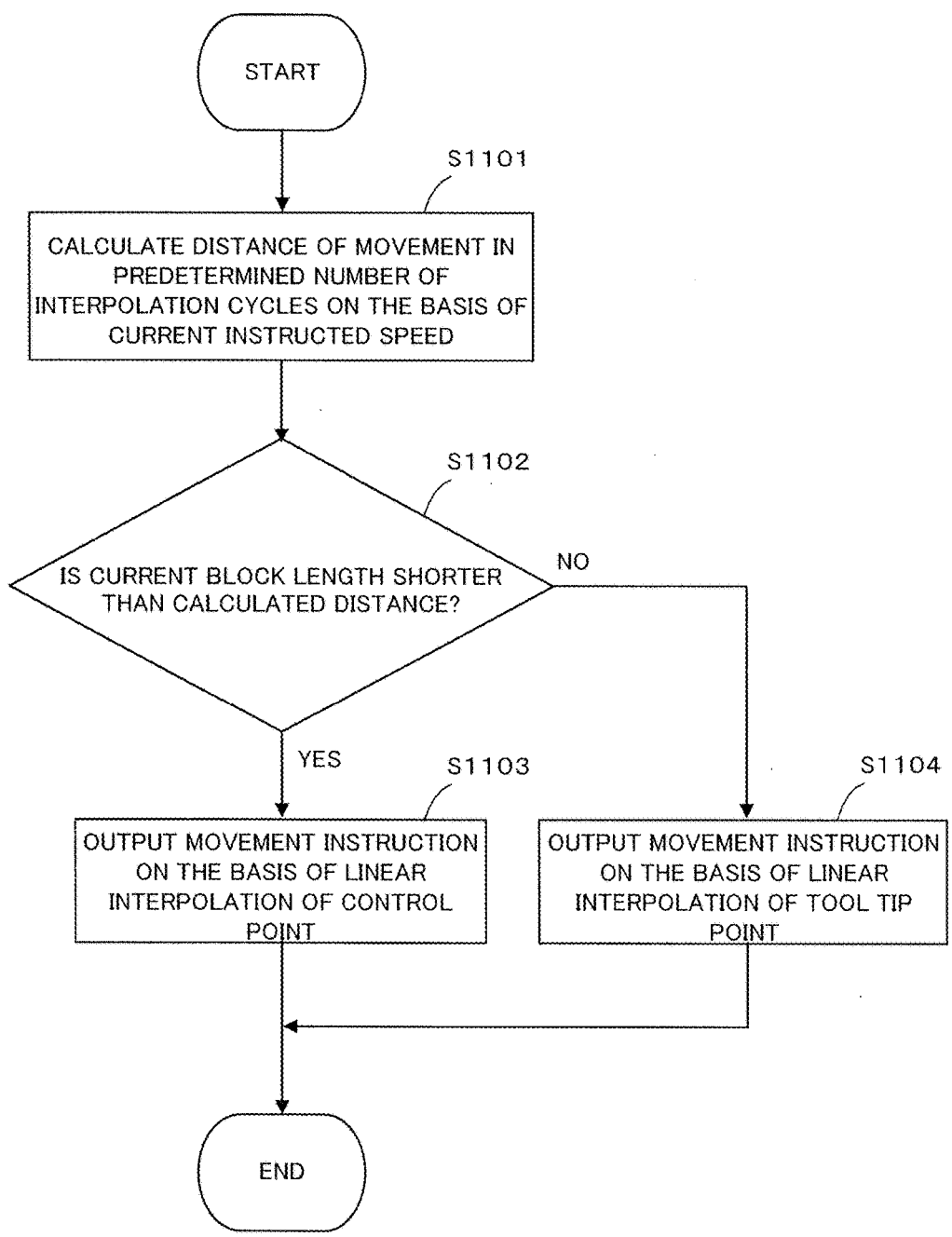
FIG. 11 is a flow chart of a control point interpolation process in embodiment 3 of the present invention.

FIG. 11 is a flow chart illustrating the algorithm of a process of linearly interpolating a movement path of the control point in a technique of the present embodiment.

After the process starts, when an instruction for one block of movement is processed, the distance that the control point can move in a predetermined number of interpolation cycles is calculated on the basis of a current instructed speed of the block of movement (S1101). Suppose that an instructed speed is F per minute [mm/min] and an interpolation cycle is dt [ms]. An amount of movement of the control point for each interpolation cycle can then be calculated as F×dt/60000. It is then determined whether a block length instructed for the block is shorter than the distance that the control point can move in two interpolation cycles calculated in S1101 (S1102). If it is determined in S1102 that the block length instructed for the block is shorter than the distance that the control point can move in two interpolation cycles, then an instruction on the basis of a linear interpolation of the control point is adopted (S1103). If it is determined in S1102 that the block length instructed for the block is longer than the distance that the control point can move in two interpolation cycles, then an instruction on the basis of a linear interpolation of the tool tip point is adopted (S1104).

The number of interpolation cycles needed for completing one block of movement within which the control point is linearly interpolated can be set as a parameter in the CMOS 14, for example, for flexibly dealing with various types of machining.

By executing such processing, a reversal of the control point becomes harder to occur in comparison with a conventional tool tip point control mode, resulting in an improvement in a machined surface quality.

What is claimed is:

1. A numerical controller having a tool tip point control function, the numerical controller including at least one processor being configured to perform the method comprising:
    generating, in a multi-axis machine tool having three linear axes and two rotation axes, a first movement instruction for moving a tip point of a tool along a first movement path;
    generating, on the basis of the first movement instruction, a second movement instruction for moving a control point of the tool along a second movement path;
    generating a third movement instruction for moving the control point of the tool along a third movement path obtained by linearly interpolating the second movement path;
    calculating, on the basis of coordinates of the third movement path, an inclination of the tool, and a length of the tool, a fourth movement path of the tip point of the tool, wherein the fourth movement path is arced;
    determining whether the distance between the first movement path and the fourth movement path is within a predetermined tolerance; and
    outputting the third movement instruction if the determination unit determines that the distance is within the predetermined tolerance.

2. A numerical controller having a tool tip point control function, the numerical controller including at least one processor being configured to perform the method comprising:
    generating, in a multi-axis machine tool having three linear axes and two rotation axes, a first movement instruction for moving a tip point of a tool along a first movement path;
    generating, on the basis of the coordinates of first movement path, an inclination of the tool, and a length of the tool, a second movement instruction for moving a control point of the tool along a second movement path, wherein the second movement path is arced;
    generating a third movement instruction for moving the control point of the tool along a third movement path obtained by linearly interpolating the second movement path;
    determining whether a distance between the second movement path and the third movement path is within a predetermined tolerance; and
    outputting the third movement instruction if the distance is within the predetermined tolerance.

3. A numerical controller having a tool tip point control function, the numerical controller including at least one processor being configured to perform the method comprising:
    setting, in a memory of the numerical controller, a predetermined number of interpolation cycles based on a type of machining;
    generating, in a multi-axis machine tool having three linear axes and two rotation axes, a first movement instruction for moving a tip point of a tool along a first movement path;
    generating, on the basis of the first movement instruction, a second movement instruction for moving a control point of the tool along a second movement path;
    generating a third movement instruction for moving the control point of the tool along a third movement path obtained by linearly interpolating the second movement path;
    determining whether a movement of the control point of the tool on the basis of the second movement instruction is completed within a predetermined number of interpolation cycles;
    outputting the third movement instruction if the movement of the control point of the tool on the basis of the second movement instruction is completed within the predetermined number of interpolation cycles;
    determining whether a movement of the tip point of the tool on the basis of the first movement instruction is completed within the predetermined number of interpolation cycles; and
    outputting the third movement instruction if the movement of the tip point of the tool on the basis of the first movement instruction is completed within the predetermined number of interpolation cycles.

* * * * *